US012645692B2

(12) United States Patent
Venkateswaran

(10) Patent No.: US 12,645,692 B2
(45) Date of Patent: Jun. 2, 2026

(54) MECHANISMS FOR UTILIZING ADDITIONAL DATABASE FUNCTIONALITY IN A LINKED DATABASE SYSTEM

(71) Applicant: Salesforce, Inc., San Francisco, CA (US)

(72) Inventor: Barathan Venkateswaran, Irvine, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 18/618,858

(22) Filed: Mar. 27, 2024

(65) Prior Publication Data

US 2025/0307262 A1     Oct. 2, 2025

(51) Int. Cl.
G06F 16/00 (2019.01)
G06F 16/245 (2019.01)
G06F 16/25 (2019.01)

(52) U.S. Cl.
CPC .......... G06F 16/256 (2019.01); G06F 16/245 (2019.01)

(58) Field of Classification Search
CPC ............................ G06F 16/256; G06F 16/245
USPC ........................................................ 707/769
See application file for complete search history.

(56) References Cited

U.S. PATENT DOCUMENTS

| | | | |
|---|---|---|---|
| 7,437,609 B2 | 10/2008 | Anderson, Jr. et al. | |
| 10,929,428 B1 | 2/2021 | Brahmadesam et al. | |
| 11,243,981 B2 | 2/2022 | O'Shaughnessy | |
| 11,604,804 B2 | 3/2023 | Bapat et al. | |
| 11,768,830 B1 * | 9/2023 | Brahmadesam ...... | H04L 67/141 707/771 |
| 2020/0379995 A1 * | 12/2020 | Rajaperumal ....... | G06F 16/2393 |

* cited by examiner

*Primary Examiner* — Raquel Perez-Arroyo
(74) *Attorney, Agent, or Firm* — Kowert, Hood, Munyon, Rankin & Goetzel, P.C.; Mark D. Seegers; Dean M. Munyon

(57) ABSTRACT

Techniques are disclosed that pertain to linked database systems. A computer system implements a first database system that manages a table storing data for a tenant. The computer system may receive an indication to provision, at a second database system having a database management engine of a different type than a database management engine of the first database system, data of the tenant stored in the table. The computer system provisions the data in data structures at the second database system and permits the tenant to perform, on the data, a first set of operations at the first database system and a second set of operations at the second database system. The second set of operations includes functionality not included in the first set of operations. The computer system may receive a result of processing by the tenant using the second database system and store the result in the table.

20 Claims, 9 Drawing Sheets

Table 130

|  | Tenant ID | Object ID | Record ID | Record Name | Created Date | Value 0 (310A) | Value 1 (310B) | ...... | Value 999 | Parent ID | External ID |
|---|---|---|---|---|---|---|---|---|---|---|---|
| Tenant Data 140A | T1 | O1 | O1GUID1 | Account 1 | 01-01-2023T00:00:00 | A150483782 | 10500 | | | | A123451 |
| | T1 | O2 | O2GUID2 | Contact 1 | 01-01-2023T01:00:00 | John | Doe | | | O1GUID1 | PZYXWVU |
| | T1 | O1 | O1GUID3 | Account 2 | 01-01-2023T00:00:00 | A160485212 | 251 | | | O1GUID1 | A123456 |
| | T1 | O3 | O3GUID4 | Opportunity O1 | 01-01-2023T02:00:00 | 2023-01-01OPPTY001 | 500000 | | | O1GUID1 | OPP12345 |
| Tenant Data 140B | T2 | O1 | O1GUID5 | Account 1 | 01-01-2023T00:00:00 | A130845212 | | | | | A123451 |
| | T2 | O2 | O2GUID6 | Contact 1 | 01-01-2023T03:00:00 | Jane | Doe | | | O1GUID5 | C223344 |
| | T2 | O1 | O1GUID7 | Account 2 | 01-01-2023T00:00:00 | A10985136 | | | | O1GUID5 | A123456 |
| | T2 | O4 | O4GUID8 | Order1 | 04-02-2023T04:00:00 | 0-20230402 | O2GUID6 | | | | O12345 |

Placeholder Columns 310

View 135

|  | Tenant ID | Object ID | Record ID | Record Name | Created Date | Value 0 (310A) | Value 1 (310B) | ...... | Value 999 | Parent ID | External ID |
|---|---|---|---|---|---|---|---|---|---|---|---|
| Tenant Data 140A | T1 | O1 | O1GUID1 | Account 1 | 01-01-2023T00:00:00 | A150483782 | 10500 | | | | A123451 |
| | T1 | O2 | O2GUID2 | Contact 1 | 01-01-2023T01:00:00 | John | Doe | | | O1GUID1 | PZYXWVU |
| | T1 | O1 | O1GUID3 | Account 2 | 01-01-2023T00:00:00 | A160485212 | 251 | | | O1GUID1 | A123456 |
| | T1 | O3 | O3GUID4 | Opportunity O1 | 01-01-2023T02:00:00 | 2023-01-01OPPTY001 | 500000 | | | O1GUID1 | OPP12345 |

FIG. 3A

Tenant Column Definition 320

| Tenant ID | ID | Object ID | Column ID | Field Name | Description | Data Type |
|---|---|---|---|---|---|---|
| T1 | O1Value0 | O1 | Value0 | Account Number | Account Number | varchar2(100) |
| T1 | O1Value1 | O1 | Value1 | Employee Count | Number of Employees | Number |
| T1 | O1Value2 | O1 | Value2 | Type | Type | Picklist |
| T1 | O1Value3 | O1 | Value3 | Industry | Industry | Picklist |

T1 Account View 135A

| Tenant ID | Object ID | Record ID | Record Name | Created Date | Account Number | Employee Count | Type | Industry | External ID | Parent ID |
|---|---|---|---|---|---|---|---|---|---|---|
| T1 | O1 | O1GUID1 | Account1 | 01-01-2023T00:00:00 | A150483782 | 10500 | Business Account | Construction | A123451 | |
| T1 | O1 | O1GUID3 | Account2 | 01-01-2023T00:00:00 | A160485212 | 251 | Business Account | Processed Food | A123456 | O1GUID1 |

T1 Contact View 135B

| Tenant ID | Object ID | Record ID | Record Name | Created Date | First Name | Last Name | Account Ext ID | Email | External ID | Parent ID |
|---|---|---|---|---|---|---|---|---|---|---|
| T1 | O2 | O2GUID2 | Contact1 | 01-01-2023T01:00:00 | John | Doe | A123451 | Jdoe@test.com | PZYXWVU | O1GUID1 |

T1 Opportunity View 135C

| Tenant ID | Object ID | Record ID | Record Name | Created Date | Opportunity Name | Amount | Account Ext ID | ... | External ID | Parent ID |
|---|---|---|---|---|---|---|---|---|---|---|
| T1 | O3 | O3GUID4 | OpportunityO1 | 01-01-2023T02:00:00 | 2023-01-01OPPTY00 | 500000 | A123451 | | OPP12345 | O1GUID1 |

Tenant Data 140

FIG. 3B

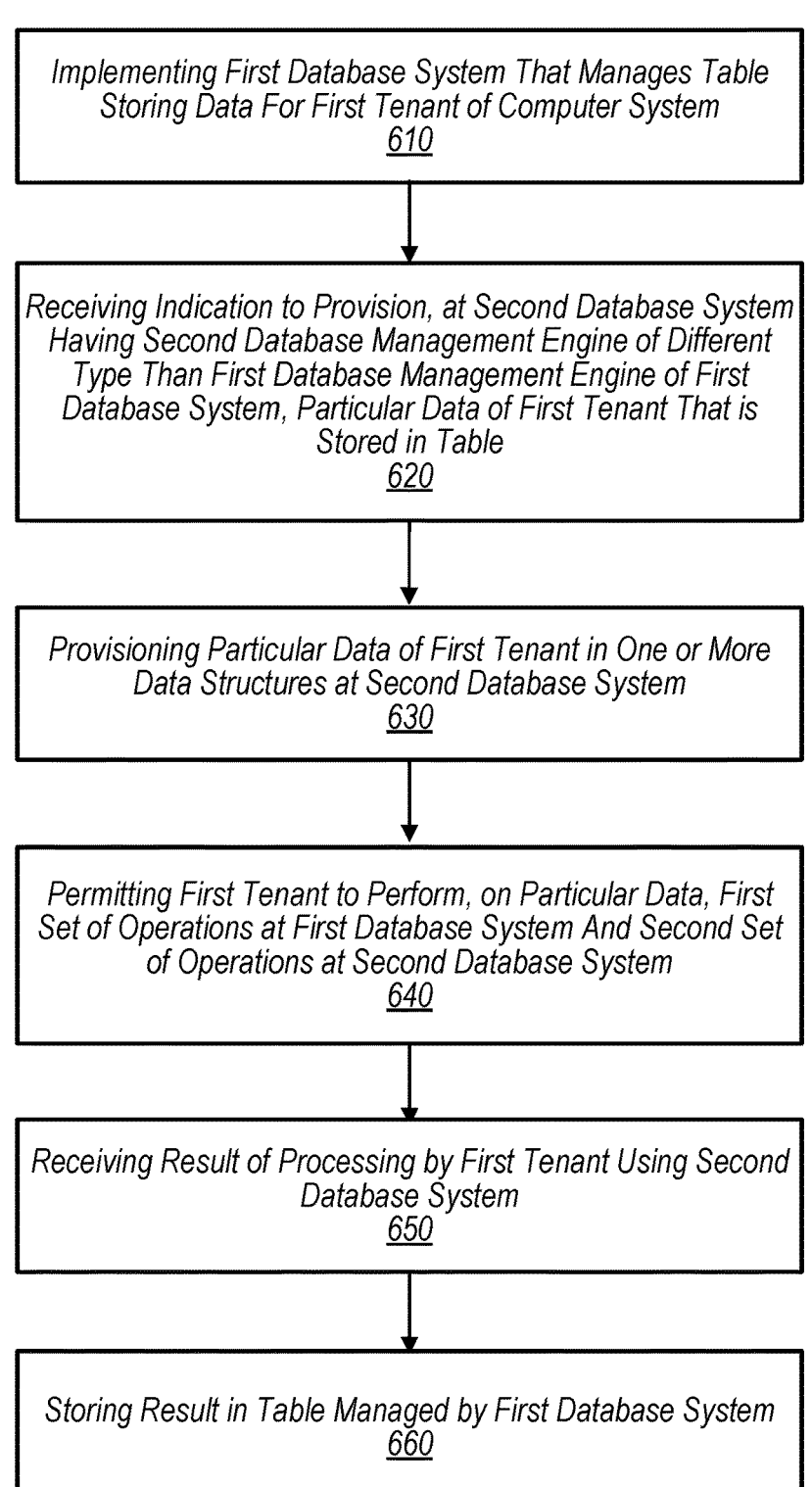

*Implementing First Database System That Manages Table Storing Data For First Tenant of Computer System*
*610*

*Receiving Indication to Provision, at Second Database System Having Second Database Management Engine of Different Type Than First Database Management Engine of First Database System, Particular Data of First Tenant That is Stored in Table*
*620*

*Provisioning Particular Data of First Tenant in One or More Data Structures at Second Database System*
*630*

*Permitting First Tenant to Perform, on Particular Data, First Set of Operations at First Database System And Second Set of Operations at Second Database System*
*640*

*Receiving Result of Processing by First Tenant Using Second Database System*
*650*

*Storing Result in Table Managed by First Database System*
*660*

*FIG. 6*

MECHANISMS FOR UTILIZING ADDITIONAL DATABASE FUNCTIONALITY IN A LINKED DATABASE SYSTEM

BACKGROUND

Technical Field

This disclosure relates generally to database systems and, more specifically, to various mechanisms for creating and utilizing linked database systems.

Description of the Related Art

Enterprises routinely implement database management systems (or, simply "database systems") that enable users to store a collection of information in an organized manner that can be efficiently accessed and manipulated. The information is often stored in database tables that comprise rows and columns, in which each column defines a grouping of that information. To access, insert, or manipulate information in a database table, a client can issue a request, in the form of a database statement (e.g., a SELECT statement), to a database system that executes it against the table. In some cases, database statements are implemented as part of complex logic that can involve processing a large volume of records (e.g., millions). For example, a user may issue a database statement having a set of join operations in which data is selectively combined from two or more tables based on criteria specified in the database statement.

BRIEF DESCRIPTION OF THE DRAWINGS

FIG. 3A is a block diagram illustrating examples of a table and a view derived from that table, according to some embodiments.

FIG. 3B is a block diagram illustrating examples of a tenant column definition and a set of views that is based on the tenant column definition, according to some embodiments.

FIG. 6 is a flow diagram illustrating an example method relating to provisioning data of a tenant at a linked database system to allow for that tenant to perform certain database operations on their data, according to some embodiments.

DETAILED DESCRIPTION

Figure 1:
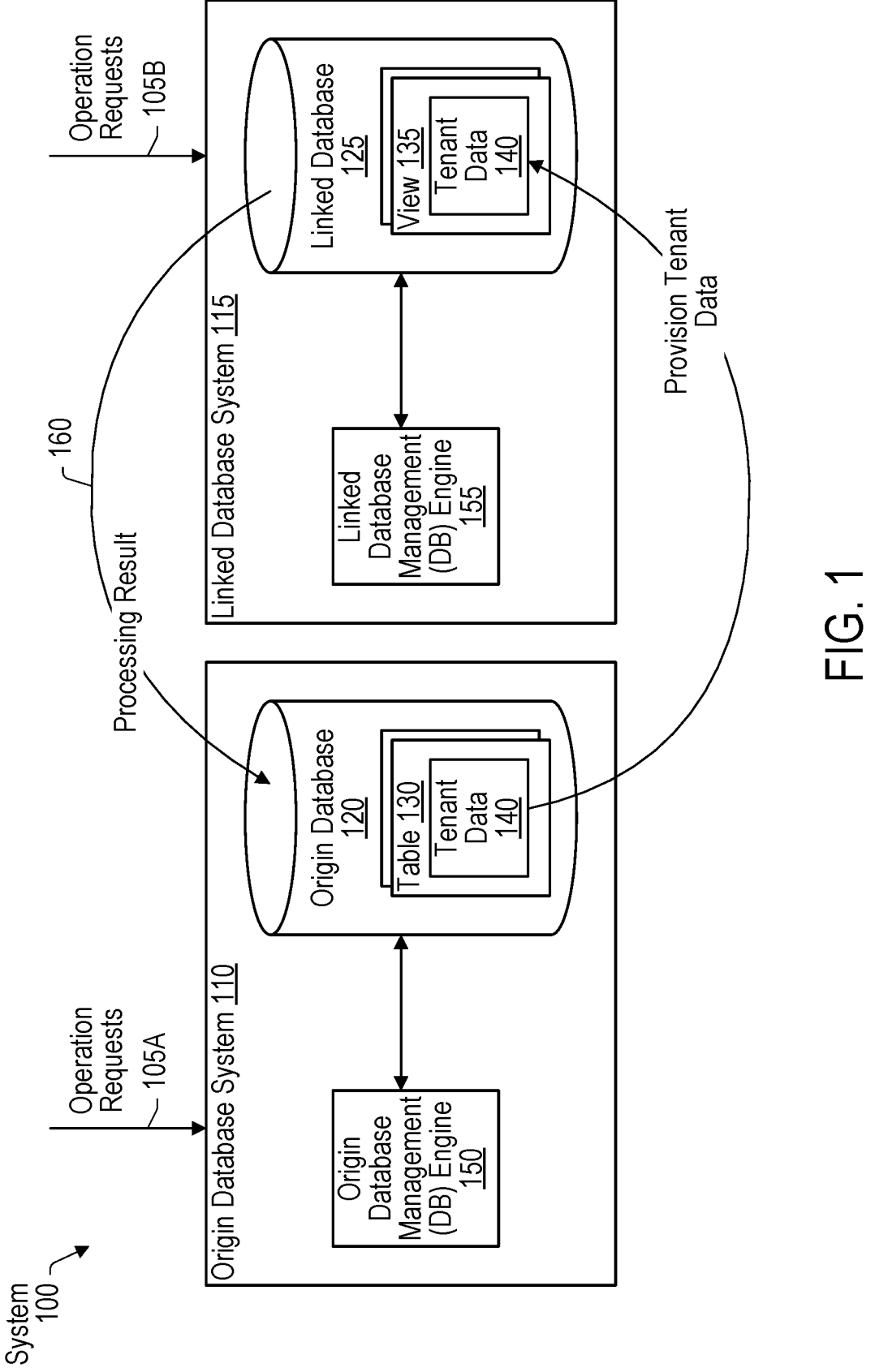
FIG. 1 is a block diagram illustrating example elements of a system comprising an origin database system and a linked database system linked to that origin database system, according to some embodiments.

In some implementations, a database system manages a database having database tables that store data for multiple entities (also referred to as "tenants") that utilize the database, which can include individual users, companies, government bodies, etc. The data stored in such tables (referred to as "multi-tenant" tables) is usually partitioned by tenant such that the data of a first tenant is not accessible to a second tenant. Since tenants may share the same database table but have different needs, in many instances, the multi-tenant table includes "placeholder" columns whose meaning to a tenant is provided by the tenant. As an example, a multi-tenant table can include a column that is defined as a "price" column by a first tenant but as a "name" column by a second tenant. Because tenants may store different types of data (e.g., text, integers, etc.) relative to each other under the same column, the placeholder columns are typically defined to store text (e.g., varchar) as other types (e.g., integers) can be stored in the form of text. Tenants provide definitions for the columns that they use so that, when their data is returned for a query, it is returned in the appropriate format. As a result, multiple tenants can share the same database table, with each tenant's specific needs being met.

While multi-tenant tables provide various benefits, there are drawbacks. For example, because there are multiple tenants storing data in the same table, those tenants are not typically provided direct access to the multi-tenant table (or, more broadly, the database) through direct commands; instead, the tenants are provided access through an interface, such as an application programing interface (API) or an object relationship mapping (ORM), in order to protect other tenant data from unapproved access. Such interfaces usually lack capabilities (e.g., self-join) that are found in typical database query languages (e.g., American National Standards Institute Structured Query Language (ANSI SQL)). Tenants are not able to leverage traditional database system supported constraints and database triggers along with a lack of support of inner, outer, and self-join capabilities. As a result, tenants cannot perform certain database operations that would otherwise be available. As another example of a drawback, when data is accessed by a tenant, that data is conformed to the tenant's definition. For example, if a tenant defines a column as a "price" column, then the string value stored for that column is converted into a numerical value when presenting it to the tenant. Accordingly, as data moves into and out of the database, it has to be transformed, which can become costly for complex operations that involve large amounts of data. As a result of these drawbacks, certain complex logic, such as pricing logic in energy industries, can bump up against governor limits that are put in place to prevent too many resources from being consumed by any tenant. While multi-tenant tables are discussed as an example throughout this disclosure, other database implementations have drawbacks as well and thus are not suitable for certain processing demands of their users. This disclosure addresses, among other things, the technical problem of how to allow for an entity to use database features for their own logic/application that are not provided or otherwise made available by the database system that manages their data.

In various embodiments described below, a system includes an origin database system and a set of linked database systems linked to that origin database system. The origin database system manages a table (e.g., a multi-tenant table) storing data for a tenant of the system. That table may be managed using a database management engine that is of a different type than the database management engine(s) of the linked database systems. As used here, the terminology "different type" in the context of database management engines (or broadly, database systems) refers to database management engines that manage data differently relative to each other. For example, a database management engine that processes database statements that are written in ANSI SQL is a different type of database management engine than one that processes database statements written using the Object Query Language (OQL). As another example, a database management engine that stores data in a non-relational database (e.g., MongoDB®) is a different type than a database management engine that stores data in a relational database (e.g., PostgreSQL®). The term "different type" does not refer to different instances of the same database management engine or different versions of the database management engine. Thus, instances of the same database management engine that are executed on different public clouds are not different types of database management engines.

The system may receive an indication (e.g., a request from the tenant) to provision, at a linked database system, particular data of the tenant that is stored in the table. As an example, the table may be a multi-tenant table storing data for thousands of tenants, and the tenant may request that all their data from that multi-tenant table be made available at the linked database system. Accordingly, in various embodiments, the system provisions the particular data of the tenant in one or more database views at that linked database system. The system then permits the tenant to perform a set of operations on their data at the linked database system. In various embodiments, the set of operations that the tenant can perform at the linked database system includes functionality that the tenant is not permitted to perform at the origin database system. For example, the tenant may be permitted to perform a self-join operation at the linked database system but not at the origin database system. In some embodiments, the database views at the linked database system are read-only. The tenant may thus return a result from their processing at the linked database system to the origin database system via a provided interface, such as an API, an ORM, or any custom DB adapter. The origin database system may store the result in its database, potentially in the table or tables that were the data source for the linked database system.

These techniques may be advantageous over prior approaches as these techniques allow for an entity to use database features (e.g., a self-join operation) for their own logic/application that are not provided by the database system that manages their data. For example, a database system that manages a multi-tenant table may not implement all the functionality provided by ANSI SQL in order to prevent one tenant from implementing queries that can interact with the data of another tenant. Accordingly, a linked database system that implements ANSI SQL can be spun up specifically for that tenant so that the tenant can leverage ANSI SQL to implement complex queries (e.g., ones that use JOINs, sub-queries, etc.) on their data. Further, complex queries can be resource intensive. Because the linked database system can be allocated its own set of resources, the tenant can execute their complex queries without degrading the experience of other tenants compared to the case in which an origin database system is processing queries from multiple tenants against the same multi-tenant table. Moreover, tenants may more easily migrate their custom applications/logic to the disclosed system as a linked database system can be spun that provides the database features expected by the custom applications/logic.

Figure 2:
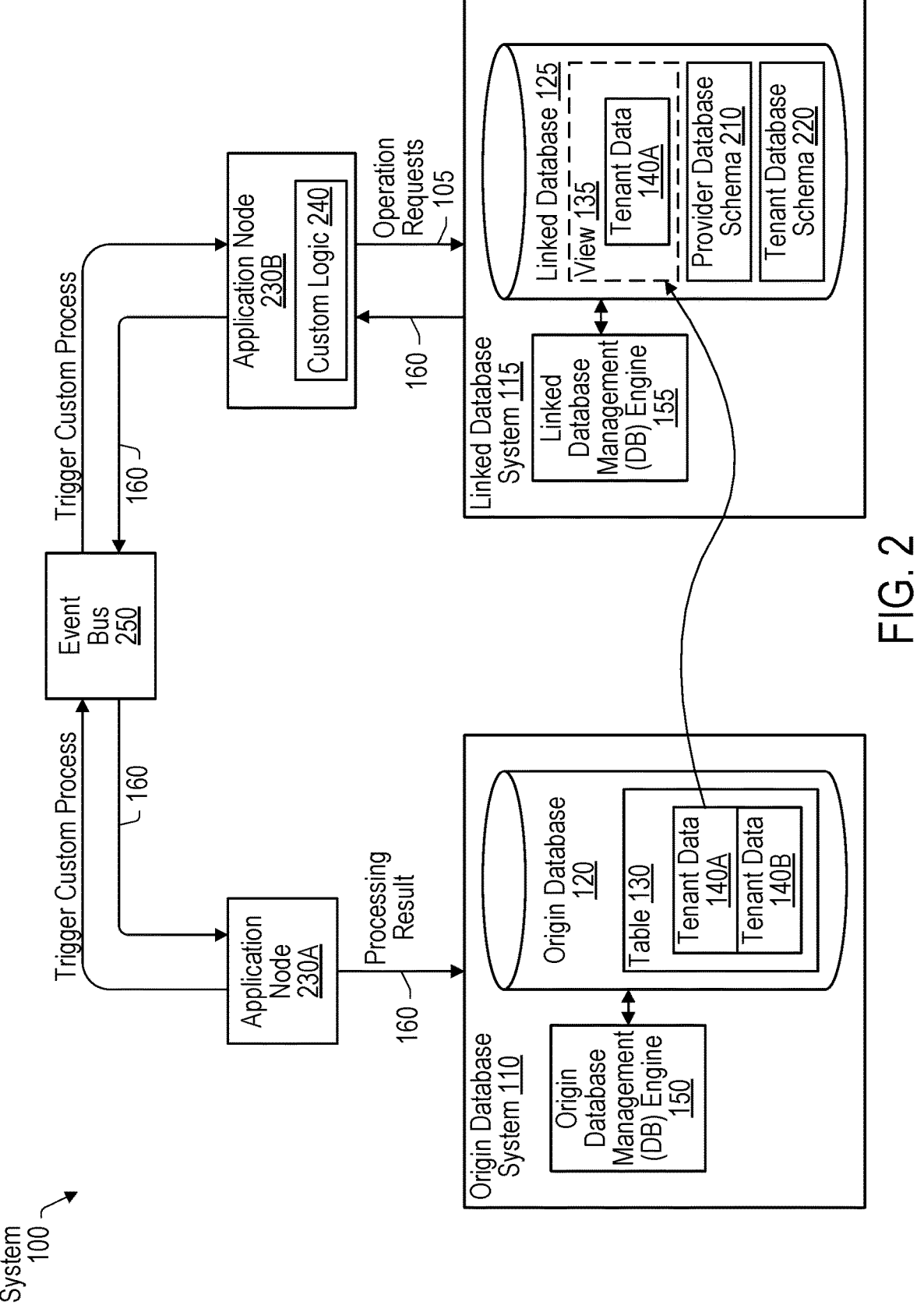
FIG. 2 is a block diagram illustrating example elements of a system comprising an origin database system, a linked database system, and application nodes that respectively interact with those database systems, according to some embodiments.

Turning now to FIG. 1, a block diagram of a system 100 is shown. System 100 includes a set of components that may be implemented via hardware or a combination of hardware and software. In the illustrated embodiment, system 100 comprises an origin database system 110 and a linked database system 115. As further shown, origin database system 110 includes an origin database 120 (with a table 130 that includes tenant data 140) and an origin database management engine 150 (also referred to as origin DB engine 150). As shown, linked database system 115 includes a linked database 125 (with a view 135 that includes tenant data 140) and a linked database management engine 155 (also referred to as linked DB engine 155). Also as shown, origin database system 110 and linked database system 115 receive operation requests 105A and 105B, respectively. The illustrated embodiment can be implemented differently than shown. For example, system 100 might include multiple linked database systems 115 that are linked to origin database system 110 and application nodes (as illustrated in FIG. 2), and linked database 125 may use a table instead of a view 135.

System 100, in various embodiments, implements a platform service (e.g., a customer relationship management (CRM) platform service) that allows users of that service to develop, run, and manage applications. System 100 may be a multi-tenant system that provides various functionality to users/tenants hosted by the multi-tenant system. Accordingly, system 100 may execute software routines from various, different users (e.g., providers and tenants of system 100) as well as provide code, web pages, and other data to users, databases (e.g., databases 120 and 125), and other entities associated with system 100. In various embodiments, system 100 is implemented using a cloud infrastructure that is provided by a cloud provider—e.g., Amazon Web Services®. Thus, database systems 110 and 115 may utilize the available cloud resources of that cloud infrastructure (e.g., computing resources, storage resources, network resources, etc.) in order to facilitate their operation. For example, software for implementing origin DB engine 150 may be stored on one or more non-transitory computer-readable mediums of server-based hardware included in a datacenter and executed in one or more virtual machines hosted on that server-based hardware. Components of system 100 might be implemented without the assistance of a virtual machine or other deployment technologies, such as containerization. In some embodiments, system 100 is implemented using local or private infrastructure as opposed to a public cloud.

Database systems 110 and 115, in various embodiments, implement database services, such as data storage, data retrieval, and data manipulation. In various embodiments, database systems 110 and 115 are software that is executable on hardware, while in some embodiments, they encompass both the hardware and the software. The database services may be provided to components within and/or external to system 100. For example, origin database system 110 may receive, via an established connection with an application node, an operation request 105A to perform one or more database operations for a database transaction. A database transaction, in various embodiments, is a logical unit of work (e.g., a specified set of database statements) For example, processing a database transaction may include executing a SELECT statement to select and return one or more rows from table 130. The contents of a row may be specified in a record and thus origin database system 110 may return one or more records corresponding to the one or more rows. Those one or more records may be returned in an operation response to the issuer (e.g., an application node) of the particular operation request 105A.

In various embodiments, database systems 110 and 115 are different types of database systems. In various cases, origin DB engine 150 and linked DB engine 155 process statements written in different database query languages. For example, origin DB engine 150 may process statements written in OQL while linked DB engine 155 processes statements written in ANSI SQL. In some cases, origin database system 110 may receive queries in one language (e.g., OQL) and convert them into a different query language (e.g., basic SQL) before processing them while linked database system 115 may not perform any such conversion (e.g., receives queries written in ANSI SQL). OQL may serve as a wrapper around basic SQL functions (e.g., Select, Insert, etc.) as tenants are not allowed to directly use SQL and also the conversion from OQL to basic SQL may occur elsewhere in system 100 than at a database system. In various embodiments, OQL does not support all the functionality of ANSI SQL and thus tenant are not able to perform certain database operations (e.g., inner, outer, and self-joins). In some cases, origin database 120 and linked database 125 are different database types or subtypes of the same database type. As an example, origin database 120 may be a relational database while linked database 125 is a non-relational database, or both databases 120 and 125 may be relational databases or non-relational databases—e.g., origin database 120 may be a Resource Description Framework triple store while linked database 125 is a graph database. Also, as another example, origin database 120 may be a key-value store while linked database 125 is an object database. Furthermore, in some cases, origin DB engine 150 and linked DB engine 155 implement different query optimizations for the same query. Accordingly, database systems 110 and 115 can be different types in a variety of different ways. In some cases, database systems 110 and 115 are the same except database system 115 does not include the constraints of multi-tenancy. Because data for multiple tenants may not be contained within the same database structures at linked database system 115, linked database system 115 may support more functionality of the same query language (e.g., linked database system 115 may support more functionality of ANSI SQL than origin database system 110).

Databases 120 and 125, in various embodiments, are collections of information that are organized in a manner that allows for access, storage, and/or manipulation of that information. Databases 120 and 125 may include supporting software (e.g., storage systems) that allows for DB engines 150 and 155 to carry out the operations (e.g., accessing) on the information stored at those databases. In various embodiments, databases 120 and 125 are implemented using a single or multiple storage devices (e.g., solid state drives) that are connected on a network (e.g., a storage attached network (SAN)) and configured to redundantly store information in order to prevent data loss. The storage devices may store data persistently and thus databases 120 and 125 may serve as persistent storage for their respective database systems. Further, as discussed, components of system 100 may utilize the available cloud resources of a cloud infrastructure and thus the data of databases 120 and 125 may be stored using a storage service provided by a cloud provider (e.g., Amazon S3®). In various embodiments, data that is written to databases 120 and 125 by a database management engine is accessible to other instances of the database management engine in a multi-node configuration. In various embodiments, data can be stored at origin database 120 in records that are included in table 130.

Table 130, in various embodiments, is a database object that stores tenant data 140 in the form of a set of data records. Table 130 may store tenant data 140 in an organized structure that comprises columns and rows, in which a column defines a field and a row corresponds to a record that stores one or more values for those columns. For example, a field may correspond to usernames and thus a record of table 130 may include a value that identifies a username for that field. In various embodiments, table 130 is a multi-tenant table that stores data for multiple tenants. As discussed in more detail with respect to FIG. 3A, a multi-tenant table may include placeholder columns whose meaning to a tenant is provided by that tenant. For example, two tenants sharing the same column may define that column differently, where one might define the column as a price column while the other defines it as a username column. Accordingly, a record of the former tenant may include a price value under that column while a record of the latter tenant may include a username value under that column. As discussed in more detail with respect to FIG. 3B, the meaning of columns to a tenant can be provided by that tenant in tenant column definitions that represent metadata for table 130. Table 130 may also include a tenant column defining tenant as a subset of data under which each record table 130 specifies a tenant (a tenant identifier) corresponding to that record. Accordingly, through these tenant identifiers, origin database system 110 may ensure that a tenant does not access other tenant data 140 that the tenant is not authorized to access. While a table is discussed with respect to the illustrated embodiment, other database objects may be used—e.g., tenant data 140 may be stored using a set of graphs in an embodiment in which origin database 120 is a graph database.

View 135, in various embodiments, is a virtual table whose contents are defined by a query. Like table 130, view 135 includes columns and rows, in which a column defines a field and a row corresponds to a record that stores one or more values for those columns. In various embodiments, the rows and columns of view 135 come from tables (e.g., table 130) referenced in the query defining view 135 and may be produced dynamically when view 135 is referenced. View 135 can include a subset of the rows and/or the columns of table 130 and thus can act as a filter on table 130. Accordingly, view 135 can be created to include only the tenant data 140 of a particular tenant even if table 130 stores data for multiple tenants. In various embodiments, the query that defines view 135 can reference one or more tables 130 and/or other views in the current or other databases. Accordingly, a query can be executed by linked DB engine 155 that generates view 135 based on table 130 at origin database 120—as shown, tenant data 140 of a tenant in table 130 is provisioned from table 130 to view 135.

A query may define view 135 to use data from multiple heterogeneous sources and thus view 135 may contain data from a tenant's own personal database in addition to their tenant data 140 from table 130. In various embodiments, view 135 is a read-only database structure that cannot be updated by a tenant. Accordingly, if a tenant accesses their data from view 135 (via operation requests 105B) and operates on it to generate a processing result 160, then the tenant may store that processing result 160 at origin database 120 instead of at linked database 125 in embodiments in which view 135 is read only. In some embodiments, view 135 can be updated in place, and updates to view 135 are propagated back to the underlying table(s) 130 of origin database system 110.

Origin DB engine 150 and linked DB engine 155, in various embodiments, are software that provides the database services of origin database system 110 and linked database system 115, respectively. Accordingly, DB engines 150 and 155 can receive operation requests 105A and 105B, respectively, (e.g., from application servers) and process them. In order to process an operation request, DB engines 150 and 155 may execute one or more query plans defining respective sequences of steps to be executed in order to implement database statements of that operation request. In various embodiments, DB engines 150 and 155 can access a definition of a query plan (e.g., from their database), compile it into a form that can be executed, and store it in a local in-memory cache. In response to a request to execute a database statement as part of a database transaction, DB engines 150 and 155 can retrieve and execute the compiled form of the query plan that corresponds to that database statement. As part of handling an operation request, DB engines 150 and 155 may also execute user-defined functions to perform desired operations, which may be stored in their local in-memory cache. In various embodiments, DB engines 150 and 155 process database transactions according to guiding principles that ensure transactional consistency, such as ACID (Atomicity, Consistency, Isolation, and Durability). Further, in various embodiments, origin DB engine 150 and linked DB engine 155 are different types of DB engines and thus linked DB engine 155 may implement functionality not provided by origin DB engine 150 and vice versa. Accordingly, an operation request 105B may include a database statement that cannot be sent in an operation request 105A to origin database system 110.

As discussed in greater detail below, when a tenant of system 100 wishes to implement logic that uses database features that are not provided by origin database system 110, the tenant may request that a linked database system 115 of a particular type be spun up and provisioned with their tenant data 140. System 100 may instantiate that linked database system 115 (or use an already instantiated linked database system 115) and provision that tenant's data 140 at that linked database system 115 in the form of one or more views 135 created by executing queries against the linked DB engine 155 of that linked database system 115. Once the tenant's data is available, the tenant may issue operation requests 105 against that linked database system 115 to access and manipulate their data. The tenant may generate a processing result 160 and store that processing result 160 back at origin database system 110. As discussed in more detail with respect to FIG. 4A, multiple linked database systems 115 can be instantiated and linked to origin database system 110, and as discussed in more detail with respect to FIG. 4B, a linked database system 115 may store tenant data 140 for multiple tenants. Also, as discussed in greater detail with respect to FIG. 5, when a tenant is operating on their data at a linked database system 115, the underlying data at origin database 120 may be locked in order to prevent any operations at origin database system 110 from creating an inconsistent state for that tenant's data.

Turning now to FIG. 2, a block diagram of another example of system 100 is shown. In the illustrated embodiment, system 100 comprises origin database system 110, linked database system 115, application nodes 230A and 230B, and an event bus 250. As further shown, origin database system 110 includes origin database 120 (having a table 130 that includes tenant data 140A for a first tenant and tenant data 140B for a second tenant of system 100) and origin DB engine 150, linked database system 115 includes linked database 125 (having a view 135 that includes tenant data 140A) and linked DB engine 155, and application node 230B includes custom logic 240. Also as shown, linked database 125 includes a provider database schema 210 and a tenant schema 220. The illustrated embodiment can be implemented differently than shown. For example, linked database 125 may also include a third-party database schema along with schemas 210 and 220, processing result 160 may be provided from linked database system 115 to origin database system 110, and the same application node 230 may interact with origin database system 110 and linked database system 115.

As discussed, a tenant may request that a portion or all of their tenant data 140 for a set of tables 130 be provisioned in a specific type of linked database system 115. In certain cases, a tenant may enroll in a subscription model in which they are permitted to use particular linked database systems 115. Accordingly, system 100 may receive an indication that at least a portion of the tenant's data should be provisioned to one or more linked database systems 115. In some cases, those linked database systems 115 may already be instantiated and thus system 100 does not have to instantiate them. But in other cases, system 100 has to instantiate them. In order to instantiate a given linked database system 115, in various embodiments, system 100 interacts with a cloud provider to provision resources (e.g., virtual machines, storage volumes, network components, etc.) and with a deployment service, such a Kubernetes®, to deploy that linked database system 115 onto those provisioned resources. The cloud provider may implement an API that allows system 100 to request, via API calls, that the cloud provider provision various types of resources to a target cloud environment.

In some embodiments, a deployment service maintains environment information about the resources provisioned by a cloud provider-resources that are requested by system 100 and the configuration of the environment(s) managed by the deployment service. The resources can include, for example, processing devices, storage devices, virtual machines, physical host machines, and network components (e.g., routers). Accordingly, the environment information may describe, for example, a set of host machines that constitute a certain computer network, their compute resources (e.g., processing and memory capability), the software programs that are running on those machines, and the internal networks of each of those host machines. In various embodiments, the deployment service uses the environment information to deploy the database systems 110 and 115 onto resources. For example, when deploying linked DB engine 155, the deployment service may access the environment information and then determine what resources are available and capable of being used to deploy a database server. The deployment service may identify available resources and then communicate with an agent node executing locally on the resources in order to instantiate linked DB engine 155 on the resources.

As a part of instantiating the illustrated linked database system 115 and provisioning tenant data 140A, in various embodiments, system 100 checks authorization policies to ensure that the requesting entity is the tenant associated with tenant data 140A and also has permission for tenant data 140A to be provisioned at linked database system 115. As a part of instantiating the illustrated linked database system 115 and provisioning tenant data 140A at linked database 125, in various embodiments, system 100 also creates provider database schema 220.

A database schema, in various embodiments, is a collection of information that defines how data is organized in a database (e.g., databases 120 and 125) and how subsets of that data are related. As such, a database schema can serve as a blueprint that provides a logical grouping of the objects in a database, such as tables, views, stored procedures, etc. For example, origin database 120 can be associated with a database schema that defines table 130, including the fields that make up table 130. Moreover, each one of those fields may be associated with a set of properties that is defined by the database schema. For example, the database schema might define a "value0" field having a data type of "varchar." A database schema may further define the relationships among objects (e.g., tables, columns to tables, etc.) in a database. A database schema may define, for a table, a primary key that can be used to uniquely identify each record of the table and additional metadata, such as database triggers that are executed upon certain events occurring in relation to the database objects defined by the database schema.

Provider database schema 210, in various embodiments, is a database schema generated by a provider of database systems 110 and 115. In order to prevent a tenant from accessing the data of another tenant from table 130 (in the case that it is a multi-tenant table), the provider of database systems 110 and 115 may maintain control over linked database system 115 and provision provider database schema 210 to provide a controlled view of a tenant's tenant data 140 at linked database 125. Thus, provider database schema 210 may define one or more data structures and at least a portion of a tenant's tenant data 140 as a data source of the one or more data structures. In the illustrated embodiment, linked database 125 includes view 135 of tenant data 140A. Accordingly, provider database schema 210 defines view 135 and tenant data 140A of table 130 as a source for view 135—view 135 can be created through a database statement executed at linked database system 115.

Tenant database schema 220, in various embodiments, is a database schema generated by a tenant. In some cases, when processing their data, a tenant may wish to use custom tables. Accordingly, a tenant may provide their own tenant database schema 220 that defines a set of database objects (e.g., tables) and the one or more data structures (e.g., view 135) defined by provider database schema 210 as a data source of the set of database objects-tenant database schema 220 thus references the structures of provider database schema 210, which itself in turn references structures (e.g., table 130) of origin database 120. Tenant database schema 220 may also reference other additional sources of data. For example, a tenant may maintain a database that is separate from system 100 but stores data that the tenant wishes to operate on along with their data at origin database 120. As such, that tenant may define their tenant database schema 220 such that it references the database external to system 100 and the one or more structures defined by provider database schema. In various embodiments, a tenant is permitted to modify their tenant database schema 220 but not the provider database schema 210 at linked database system 125. In certain cases, a third party may generate a third party database schema that sits between provider database schema 210 and tenant database schema 220—i.e., the third party database schema may define structures (e.g., tables) that reference the structures of provider database schema 210 and tenant database schema 220 may define structures that reference the structures of the third part database schema.

Application nodes 230, in various embodiments, facilitate the execution of one or more applications that perform various functions and tasks, including interacting with a DB engine to access data. In various embodiments, application nodes 230 are software that is executable on hardware, while in some embodiments, it encompasses both the hardware and the software. Examples of applications that can be implemented by application nodes 230 include a customer relationship management (CRM) service, a content streaming service, an email service, and a user-provided application (as opposed to an application provided by a provider of system 100). An application implemented by application nodes 230 may provide services to multiple tenants over a wide-area network, such as the Internet, and may be hosted on cloud infrastructure. In various embodiments, application nodes 230 interface with database systems to enable tenants to store and access their data. As an example, in the illustrated embodiment, application node 230A interacts with origin database system 110 permitting respective tenants to access tenant data 140A and 140B, and application node 230B interacts with linked database system 115 to permit the tenant of tenant data 140A to access that data at linked database 125. An application node 230 may establish database connections with a database system (e.g., using an API, such as Java Database Connectivity) through which a tenant can issue operation requests 105 to that database system.

Since application nodes 230A and 230B interact with different database systems, they may execute different applications or logic. As shown, application node 230B executes custom logic 240 that is not present at application node 230A. In various embodiments, custom logic 240 is software provided by a tenant that the tenant designed to implement a desired objective using database features of linked database system 115 that are not provided by origin database system 110. As an example, a tenant might wish to implement a complex pricing algorithm to generate a processing result 160. The complex pricing algorithm may take the form of custom logic 240 that utilizes join operations as part of facilitating that complex pricing algorithm, and custom logic 240 can be triggered by application node 230A, as shown. As further shown, the generated processing result 160 is returned to application node 230A to store in origin database 120 via event bus 250. In various embodiments, event bus 250 is a software component that is used to exchange messages between different parts of system 100. Accordingly, event bus 250 can receive a message/event from application node 230 and deliver it to application node 230A. In various cases, that message is a request to store an included processing result 160 at origin database 120. Application node 230A may issue an operation request 105 to origin DB engine 150 to store processing result 160 in origin database 120. In some cases, processing result 160 is stored in table 130 as part of tenant data 140A.

Turning now to FIG. 3A, a block diagram of an example table 130 and an example view 135 based on that table 130 is shown. In the illustrated embodiment, table 130 includes tenant data 140A and tenant data 140B that correspond to respective tenants, and view 135 includes tenant data 140A. As further shown, table 130 and view 135 include placeholder columns 310, which include columns 310A and 310B. Also, the illustrated embodiment may be implemented differently than shown. For example, table 130 may not be a multi-tenant table, view 135 may be replaced with a table storing only tenant data 140A, and/or view 135 may store a subpart of tenant data 140A instead of all tenant data 140A.

As discussed, origin database system 110 can store data for multiple tenants in the same table 130—in the illustrated embodiment, table 130 includes tenant data 140A for a first tenant and tenant 140B for a second tenant. Since multiple tenants may share the same table 130 but have different needs, that table 130 can include placeholder columns 310 that may be used to store different types of data. Furthermore, a tenant may store different entity types of data (e.g., account records, contact records, etc.) in the same table 130 that have different types of values, which may be possible using placeholder columns 310. As an example, as shown in table 130, the first row includes an alphanumeric value under placeholder column 310A while the second row belonging to the same tenant includes a string value under placeholder column 310A. A placeholder column 310, in various embodiments, is a column of type "varchar" since that type can be used to store other types of values, such as integer values, in a text format.

As discussed in more detail with respect to FIG. 3B, tenants can provide tenant column definitions that define the meaning of placeholder columns 310 to a tenant—e.g., a tenant may indicate that columns 310A and 310B are being used to store string values for contact records. As shown, view 135 includes tenant data 140A but not tenant data 140B and retains placeholder columns 310 of table 130—view 135 can be created based on a request received from the tenant associated with tenant data 140A. Since view 135 includes placeholder columns 310, in various embodiments, the tenant column definitions that are used to interpret placeholder columns 310 are provided to the appropriate linked database system 115. When reading out data from view 135, that linked database system 115 may convert the varchar values of view 135 to the value types that are defined in the tenant column definitions. For example, the value "10500" of the first row stored under placeholder column 310B may be converted into an integer value when it is read out of view 135.

Turning now to FIG. 3B, a block diagram of an example tenant column definition 320 and three views 135A-C based on that tenant column definition 320 is shown. In the illustrated embodiment, tenant column definition 320 defines field names for four different columns (e.g., placeholder columns 310) of a table 130 (not depicted). As further shown, view 135A includes account records and thus is an account view 135, view 135B includes contact records and thus is a contact view 135, and view 135C includes opportunity records and thus is an opportunity view 135. Also, the illustrated embodiment may be implemented differently than shown. For example, views 135A-C may be replaced with tables in some embodiments or there may be one view 135 (storing all the illustrated records) instead of three views 135.

As discussed, in various embodiments, a tenant provides tenant column definitions 320 that define the meaning of placeholder columns 310 to a tenant. A tenant may provide a tenant column definition 220 for each entity type of data (e.g., account records, contact records, and opportunity records)—these entity types may be connoted by an object ID (e.g., opportunity records may have an object ID "O3"). In the illustrated embodiment, tenant column definition 320 provides definitions of placeholder columns "Value0," "Value1," "Value2," and "Value3" with respect to account records (object ID "O1"). As an example, the column in account view 135A that corresponds to placeholder column "Value0" should be named "Account Number" and have a type "varchar2(100)." While not shown, another tenant column definition 320 may provide definitions of placeholder columns "Value0," "Value1," "Value2," and "Value3" with respect to contact records (object ID "O2"). Consequently, the column in contact view 135B that corresponds to placeholder column "Value0" can be conformed based on the definition in that tenant column definition 320. Furthermore, a different tenant may provide a tenant column definition 220 that provides definitions of placeholder columns "Value0," "Value1," "Value2," and "Value3" with respect to account records (object ID "O1"). Accordingly, different tenants may provide different tenant column definitions 320 for the same placeholder columns.

In some cases, a tenant's data 140 is presented in multiple views 135 instead of a single view 135. As shown for example, account records are included in account view 135A, contact records are included in contact view 135B, and opportunity records are included in opportunity view 135C. When creating views 135, in some embodiments, various values of a tenant's data 140 may be converted from a particular data type (e.g., varchar) used in the underlying table(s) 130 into one or more other data types (e.g., integer) as indicated by tenant column definitions 320. The names and types of the columns of those views 135 may be based on tenant column definitions 320. As an example, the underlying table 130 may have a placeholder column 310 "value0" that stores a particular varchar value. In the associated view 135, the corresponding column might be renamed to "Account ID" and store integer values as indicated by a tenant column definition 320. As a result, the particular varchar value may be converted from being a varchar value to an integer value when provisioned for that view 135. Accordingly, system 100 may conform views 135 based on tenant column definitions 320.

Figure 4A:
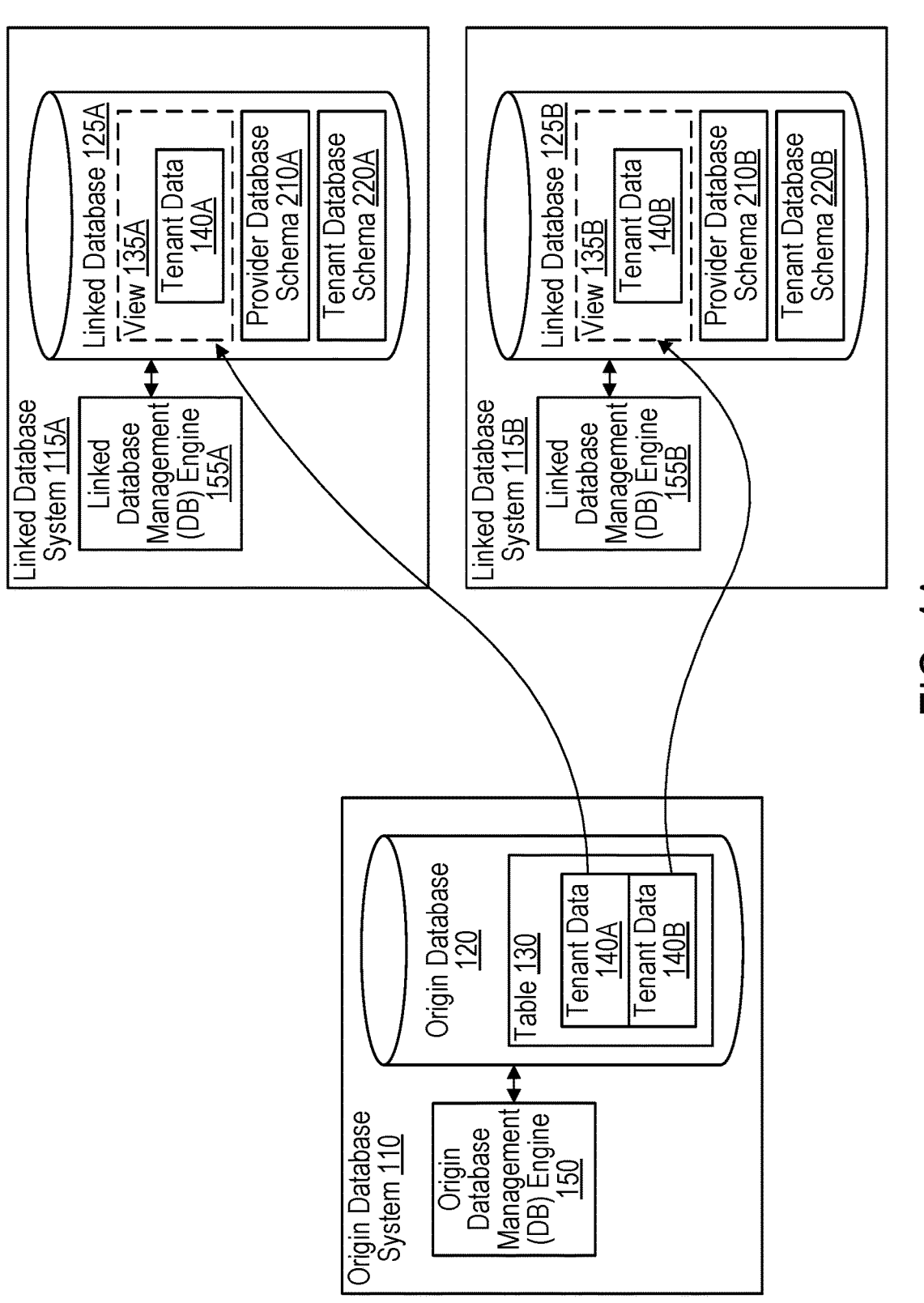
FIG. 4A is a block diagram illustrating an example in which an origin database system is linked to multiple linked database systems used by different, respective tenants, according to some embodiments.

Turning now to FIG. 4A, a block diagram of an architecture in which an example origin database system 110 is linked to multiple linked database systems 115 used by different tenants is shown. In the illustrated embodiment, there are linked database systems 115A and 115B and origin database system 110. As shown, origin database system 110 includes an origin database 120 (having a table 130 that stores tenant data 140A and 140B) and an origin DB engine 150, linked database system 115A includes a linked database 125A (having a view 135 with tenant data 140A) and a linked DB engine 155A, and linked database system 115A includes a linked database 125B (having a view 135 with tenant data 140A) and a linked DB engine 155B. Also as shown, linked database 125A stores a provider database schema 210A and a tenant schema 220A, and linked database 125B stores a provider database schema 210B and a tenant schema 220B. The illustrated embodiment may be implemented differently than shown. For example, views 135A and 135B may be part of the same linked database system 115.

In various embodiments, linked database systems 115 are tenant specific. Accordingly, when a tenant requests that their data be provisioned in a linked database system 115, system 100 may instantiate a linked database system 115 specifically for that tenant, as discussed. In the illustrated embodiment, linked database system 115A is provisioned for the tenant of tenant data 140A and linked database system 115B is provisioned for the tenant of tenant data 140B. Linked database system 115A may be the same type or a different type of database system than linked database system 115B. For example, linked database system 115A may be an Oracle® database system and linked database system 115B may be a MongoDB® database system. As such, the tenant associated with linked database system 115A may be able to use functionality that is not available to the tenant associated with linked database system 115B and vice versa. In either case, linked database systems 115A and 115B may provide functionality to the tenants that is not provided by origin database system 110.

Provider database schema 210A may define one or more data structures, including view 135A, and at least a portion of tenant data 140A as a data source, and provider database schema 210B may define one or more data structures, including view 135B, and at least a portion of tenant data 140B as a data source. When tenant data 140A and 140B are provisioned at linked database systems 115A and 115B, respectively, that tenant data may be conformed according to tenant column definitions 320 provided by the tenants of that data. Furthermore, each tenant may provide a tenant database schema 220 defining database structures (e.g., tables) that utilize an allocated view 135A (e.g., tenant database schema 220A may define one or more tables that utilize tenant data 140A from view 135A).

Figure 4B:
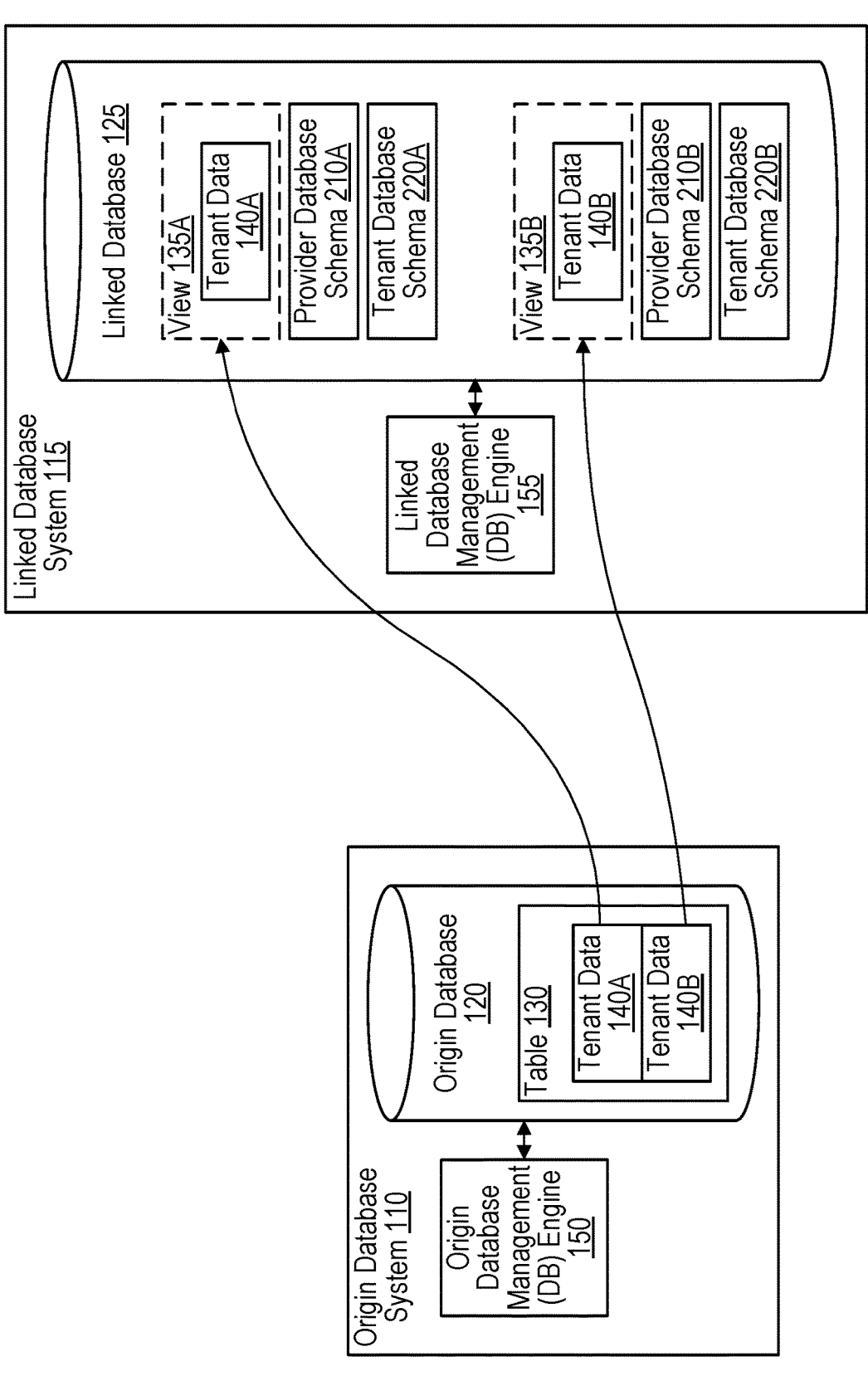
FIG. 4B is a block diagram illustrating an example in which an origin database system is linked to a linked database system used by multiple tenants, according to some embodiments.

Turning now to FIG. 4B, a block diagram of an architecture in which an origin example database system 110 is linked to a linked database system 115 that is used by multiple tenants is shown. In the illustrated embodiment, origin database system 110 includes an origin database 120 (having a table 130 that stores tenant data 140A and 140B) and an origin DB engine 150, and linked database system 115 includes a linked database 125 and a linked DB engine 155. Also as shown, linked database 125 includes a view 135A (with tenant data 140A), a provider database schema 210A, and a tenant schema 220A for a first tenant and also a view 135B (with tenant data 140B), a provider database schema 210B, and a tenant schema 220B for a second tenant. The illustrated embodiment may be implemented differently than shown. For example, tenant data 140A and 140B may be part of different linked database systems 115.

In some embodiments, linked database systems 115 are shared by multiple tenants. As such, when a tenant requests that their data be provisioned in a linked database system 115, system 100 may instantiate a linked database system 115 (if an appropriate one does not exist) or use an existing linked database system 115. System 100 may provision a provider database schema 210 at that linked database system 115 for that tenant. Accordingly, provider database schema 210A may define one or more data structures, including view 135A, for a first tenant and at least a portion of tenant data 140A as a data source, and provider database schema 210B may define one or more data structures, including view 135B, for a second tenant and at least a portion of tenant data 140B as a data source. Tenant data 140A and 140B in views 135A and 135B, respectively, can be generated according to tenant column definitions 320 provided by the tenants of that data. Furthermore, each tenant may provide a tenant database schema 220 defining database structures (e.g., tables) that use an allocated view 135A (e.g., tenant database schema 220A may define one or more tables that utilize tenant data 140A from view 135A).

Figure 5:
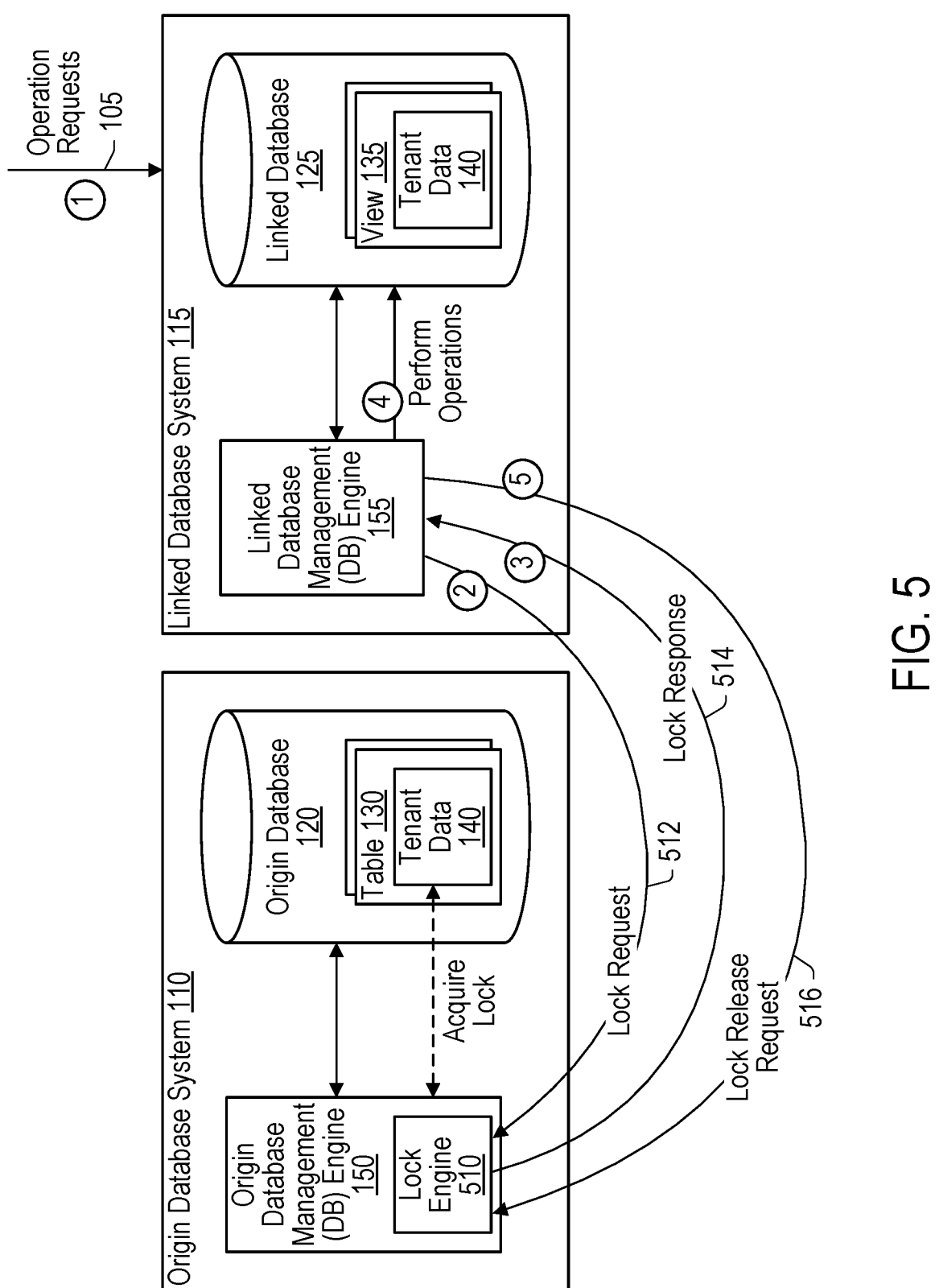
FIG. 5 is a block diagram illustrating example elements of a locking mechanism relating to origin and linked database systems, according to some embodiments.

Turning now to FIG. 5, a block diagram of a locking mechanism relating to origin and linked database systems 110 and 115 is shown. In the illustrated embodiment, origin database system 110 includes an origin DB engine 150 (with a lock engine 510) and an origin database 120 (with a table 130 having tenant data 140), and linked database system 115 includes a linked DB engine 155 and a linked database 125 (with a view 135 having tenant data 140). In order to prevent tenant data 140 at origin database system 110 from being changed while operations are being performed on that tenant data 140 at linked database system 115, database systems 110 and 115 collectively implement a locking mechanism, in various embodiments. Initially, linked database system 115 may receive a set of operation requests 105 to execute operations with respect to view 135—in some cases, these operation requests 105 may be received by the provider's system (e.g., application node 230) and be delegated to the tenant's application node after locking the relevant data in origin database 120. Before executing the operations, in various embodiments, linked DB engine 155 issues a lock request 512 to lock engine 510 to lock a portion or all of tenant data 140. That lock request 512 may identify the portion or all of tenant data 140.

Lock engine 510, in various embodiments, is a software component that manages locks for origin DB engine 150. In various embodiments, a lock is a construct that is used to protect a database resource (e.g., records of tenant data 140) from being manipulated by another entity other than the holder of that lock. A lock may take the form of a record that is stored in a lock structure (e.g., a table). In various embodiments, a lock is acquired on a database resource and has a lock mode. The database resource can correspond to a database object (e.g., a table) or a subcomponent of that database object (e.g., a record of the table). While locks are discussed as locking at the database object or subcomponent level, the techniques discussed herein can be extended to other levels (e.g., database level, file level, page level, etc.). In some cases, a lock may be acquired on multiple database resources (e.g., a table and an index that is built on that table). Also, locks may be acquired on a per-statement basis (e.g., for each database statement of a transaction), on a per-transaction basis, and on a per-session basis where the scope of a lock can span multiple database transactions. In some embodiments, locks are not acquired at the database system level, but instead an indicator is set on the corresponding rows or logical root entity (e.g., a Quote or Order record) and logic is put in place to check the lock state before accepting any DML instructions in origin database 120 until the locks are released.

In various embodiments, a lock mode defines the strength of a corresponding lock and is determined based on the types of operations that will be performed on the database resource. Examples of lock modes can include, but are not limited to, the lock modes that are used in Postgres, such as access share, row share, row exclusive, access exclusive, etc. For example, a database transaction may include a SELECT statement to access a set of records from a table. Accordingly, origin DB engine 150 may acquire an access share lock on that table to prevent it from being changed or deleted while those records are read. In various embodiments, there are various degrees in lock strength, where a weaker lock allows for more concurrent activity than a stronger lock. In some cases, the weakest lock may allow full concurrent access to a database object while the strongest lock may provide exclusive access (i.e., only the holder of the lock can access/modify the database object while the strongest lock is held).

Accordingly, lock engine 510 may acquire a lock on the portion of tenant data 140 that is identified by the received lock request 512. Lock engine 510 may then issue a lock response 514 to linked DB engine 155 that indicates that the lock(s) have been acquired. Consequently, linked DB engine 155 may proceed to perform the requested operations as shown. Once those operations have been performed. Linked DB engine 155 may return a lock release request 516 to lock engine 510 to release the acquired locks, and lock engine 510 may release the acquired locks.

Turning now to FIG. 6, a flow diagram of a method 600 is shown. Method 600 is one embodiment of a method performed by a computer system (e.g., system 100) in order to permit a tenant to perform certain database operations (e.g., self-joins) on their data. Method 600 may be performed by executing a set of program instructions stored on a non-transitory computer-readable medium. Method 600 may include more or less steps than shown and/or the steps may be performed in a different order. As an example, method 600 may include a step in which the computer system implements an interface (e.g., an API, ORM, etc.) that allows for insertion of data into a table managed using the first database system Method 600 begins in step 610 with the computer system implementing a first database system (e.g., origin database system 110) that manages a table (e.g., a table 130) storing data (e.g., tenant data 140) for a first tenant of the computer system. In various embodiments, that first database system includes a first database management engine (e.g., origin DB engine 150). In step 620, the computer system receives an indication (e.g., a provision request from the first tenant) to provision, at a second database system (e.g., linked database system 115) having a second database management engine (e.g., linked DB engine 155) of a different type than the first database management engine of the first database system, particular data of the first tenant that is stored in the table.

In step 630, the computer system provisions the particular data of the first tenant in one or more data structures (e.g., views 135) at the second database system. In some cases, the one or more data structures are read-only database views of the first tenant's portion of the table managed by the first database system. In some cases, the one or more data structures are tables or views that are not read-only. The particular data of the first tenant may include one or more values of a first data type (e.g., varchar) and the provisioning may include converting the one or more values to a second data type (e.g., integer) from the first data type.

In step 640, the computer system permits the first tenant to perform, on the particular data, a first set of operations at the first database system and a second set of operations at the second database system. The second set of operations includes functionality that is not included in the first set of operations. For example, the second set of operations may include a self-join operation that is not included in the first set of operations. In step 650, the computer system receives a result (e.g., a processing result 160) of processing by the first tenant using the second database system. In step 660, the computer system stores the result in the table managed by the first database system. The result may be received from the first tenant via an interface (e.g., API or ORM) implemented by the computer system.

In some embodiments, the table is a multi-tenant table that stores data for a plurality of tenants including the first tenant. The provisioning of the particular data of the first tenant at the second database system may include the computer system creating, at the second database system, a first provider database schema (e.g., a provider database schema 210) that defines the one or more data structures and the first tenant's portion of the multi-tenant table as a data source of the one or more data structures. The computer system may provide a tenant database schema (e.g., a tenant schema 220) that defines a set of tables for the first tenant and the one or more data structures as a data source of the set of tables. The tenant database schema may be defined by the first tenant. In various embodiments, the first tenant is permitted to modify the tenant database schema but not the provider database schema. The tenant database schema may define at least one other data source of the set of tables that is external to the first and second database systems—e.g., the tenant may have their own database and use it as a source for the data structures at the second database system.

In some embodiments, the computer system provisions, at the second database system, particular data of a second tenant that is stored in the multi-tenant table, including creating, at the second database system, a second provider database schema that defines one or more additional data structures and the second tenant's portion of the multi-tenant table as a data source of the one or more additional data structures. The particular data of the first tenant may be inaccessible to the second tenant and further the particular data of the second tenant may be inaccessible to the first tenant at the second database system. The provisioning of the data of the first and second tenants may include conforming the particular data of the first tenant in the one or more data structures based on a columns definition (e.g., a tenant column definition 320) provided by the first tenant and conforming the particular data of the second tenant in the one or more additional data structures based on a columns definition provided by the second tenant. In some embodiments, there are different instances of the second database system. A first instance may be allocated specifically for the first tenant and a second instance may be allocated specifically for the second tenant.

In some embodiments, the computer system provisions, at a third database system, the particular data of a second tenant that is stored in the multi-tenant table. The second database system may be allocated specifically for the first tenant and the third database system may be allocated specifically for the second tenant. The computer system permits the second tenant to perform the first set of operations at the first database system and a third set of operations at the third database system. The third set of operations may include functionality not included in the first set of operations. The computer system may receive, from the third database system, a result of processing by the second tenant using the third database system—in some cases, the result of processing by the first tenant is not received from the second database system. The computer system then store the result of processing by the second tenant in the multi-tenant table managed by the first database system.

Exemplary Computer System

Figure 7:
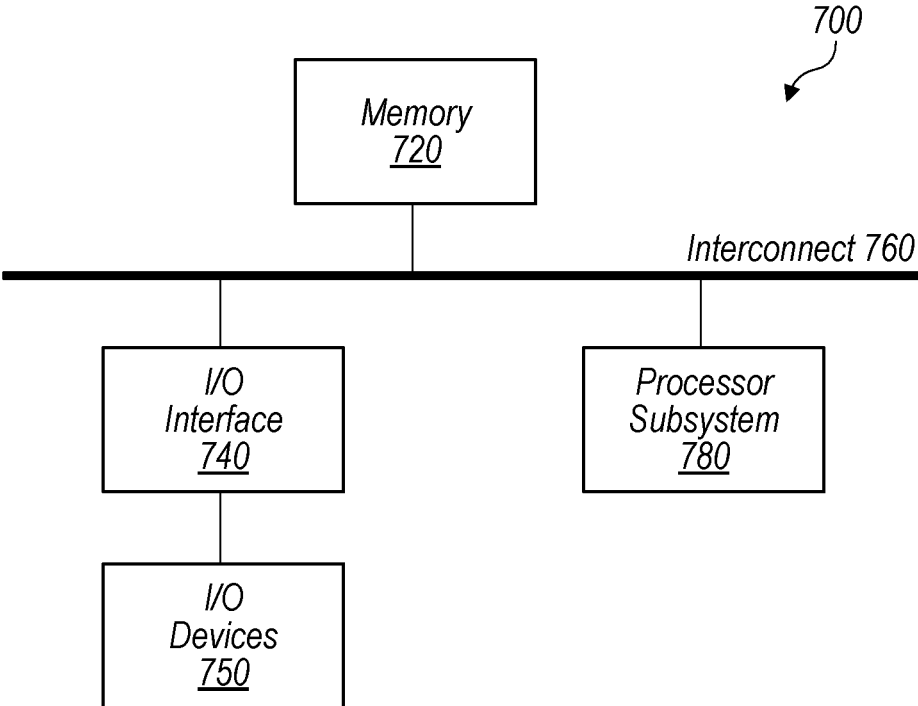
FIG. 7 is a block diagram illustrating elements of a computer system for implementing various systems described in the present disclosure, according to some embodiments.

Turning now to FIG. 7, a block diagram of an exemplary computer system 700, which may implement system 100, origin database system 110, linked database systems 115, and/or application nodes 230 is depicted. Computer system 700 includes a processor subsystem 780 that is coupled to a system memory 720 and I/O interfaces(s) 740 via an interconnect 760 (e.g., a system bus). I/O interface(s) 740 is coupled to one or more I/O devices 750. Although a single computer system 700 is shown in FIG. 7 for convenience, system 700 may also be implemented as two or more computer systems operating together.

Processor subsystem 780 may include one or more processors or processing units. In various embodiments of computer system 700, multiple instances of processor subsystem 780 may be coupled to interconnect 760. In various embodiments, processor subsystem 780 (or each processor unit within 780) may contain a cache or other form of on-board memory.

System memory 720 is usable store program instructions executable by processor subsystem 780 to cause system 700 perform various operations described herein. System memory 720 may be implemented using different physical memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 700 is not limited to primary storage such as memory 720. Rather, computer system 700 may also include other forms of storage such as cache memory in processor subsystem 780 and secondary storage on I/O Devices 750 (e.g., a hard drive, storage array, etc.). In some embodiments, these other forms of storage may also store program instructions executable by processor subsystem 780. In some embodiments, program instructions that when executed implement origin DB engine 150, origin database 120, linked DB engine 155, linked database 125, custom logic 240, and/or event bus 250 may be included/stored within system memory 720.

I/O interfaces 740 may be any of various types of interfaces configured to couple to and communicate with other devices, according to various embodiments. In one embodiment, I/O interface 740 is a bridge chip (e.g., Southbridge) from a front-side to one or more back-side buses. I/O interfaces 740 may be coupled to one or more I/O devices 750 via one or more corresponding buses or other interfaces. Examples of I/O devices 750 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 700 is coupled to a network via a network interface device 750 (e.g., configured to communicate over WiFi, Bluetooth, Ethernet, etc.).

The present disclosure includes references to an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3)

both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to"

perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

What is claimed is:

1. A method, comprising:

implementing, by a computer system, a first database system that manages a table storing data for a plurality of tenants that includes a first tenant, the first database system having a first database management engine;

receiving, by the computer system, an indication to provision particular data of the first tenant from the table to a second database system having a second database management engine that is operable to provide functionality that is not provided by the first database management engine to the first tenant;

provisioning, by the computer system, the particular data from the table to one or more database structures specifically allocated for the first tenant at the second database system but not for remaining ones of the plurality of tenants, wherein the provisioning includes creating, at the second database system, a database schema for the tenant that defines at least a portion of the table associated with the first tenant as a data source of the one or more database structures;

permitting, by the computer system, the first tenant to perform, on the particular data, a set of operations at the second database system to use at least a portion of the functionality;

receiving, by the computer system, a result of processing by the first tenant using the second database system; and storing, by the computer system, the result in the table at the first database system.

2. The method of claim 1, wherein the provisioning includes creating, at the second database system, a tenant database schema that defines a set of tables for the first tenant and the one or more database structures as a data source of the set of tables, wherein the tenant database schema is defined by the first tenant.

3. The method of claim 2, wherein the tenant database schema defines at least one other data source of the set of tables that is external to the first and second database systems.

4. The method of claim 1, further comprising:

provisioning, at the second database system by the computer system, particular data of a second tenant that is stored in the table, including creating, at the second database system, a second provider database schema that defines one or more additional database structures specifically allocated for the second tenant and the second tenant's portion of the table as a data source of the one or more additional database structures, wherein the particular data of the first tenant is inaccessible to the second tenant at the second database system.

5. The method of claim 1, wherein the method further comprises:

provisioning, at a third database system by the computer system, particular data of a second tenant that is stored in the table, wherein the second database system is allocated specifically for the first tenant and the third database system is allocated specifically for the second tenant; and permitting, by the computer system, the second tenant to perform a set of operations at the third database system that includes functionality that is not provided by the first database management engine.

6. The method of claim 5, further comprising:

receiving, from the third database system by the computer system, a result of processing by the second tenant using the third database system, wherein the result of processing by the first tenant is not received from the second database system; and storing, by the computer system, the result of processing by the second tenant in the table managed by the first database system.

7. The method of claim 1, wherein the one or more database structures are read-only database views of the first tenant's portion of the table managed by the first database system.

8. The method of claim 1, wherein the particular data of the first tenant includes one or more values of a first data type, and wherein the provisioning includes converting the one or more values to a second data type from the first data type.

9. The method of claim 1, further comprising:

locking, by the computer system, at least a portion of the particular data at the first database system while the first tenant performs one or more operations on the at least a portion at the second database system.

10. The method of claim 1, wherein the second set of operations functionality includes a self-join operation.

11. A non-transitory computer-readable medium having program instructions stored thereon that are capable of causing a computer system to perform operations comprising:

managing, using a first database system, a table storing data for a plurality of tenants that includes a first tenant, the first database system having a first database management engine;

receiving an indication to provision particular data of the first tenant from the table to a first instance of a second database system having a second database management engine that is operable to provide functionality that is not provided by the first database management engine to the first tenant;

provisioning the particular data from the table to one or more database structures specifically allocated for the first tenant at the first instance of the second database system but not for remaining ones of the plurality of tenants, wherein the provisioning includes creating, at the first instance of the second database system, a database schema for the tenant that defines at least a portion of the table associated with the first tenant as a data source of the one or more database structures;

permitting the first tenant to perform, on the particular data, a set of operations at the first instance of the second database system to use at least a portion of the functionality;

receiving a result of processing by the first tenant using the first instance of the second database system; and storing the result in the table at the first database system.

12. The non-transitory computer-readable medium of claim 11, wherein the database schema is a provider database schema, and wherein the provisioning includes creating, at the first instance of the second database system, a tenant database schema that defines a set of tables for the first tenant and the one or more database structures as a data source of the set of tables, wherein the tenant database schema is defined by the first tenant.

13. The non-transitory computer-readable medium of claim 12, wherein the first tenant is permitted to modify the tenant database schema but not the provider database schema at the first instance of the second database system.

14. The non-transitory computer-readable medium of claim 11, wherein the operations further comprise:

provisioning, at a second instance of the second database system by the computer system, particular data of a second tenant that is stored in the table, wherein the first instance is allocated specifically for the first tenant and the second instance is allocated specifically for the second tenant; and permitting, by the computer system, the second tenant to perform the set of operations at the second instance of the second database system.

15. The non-transitory computer-readable medium of claim 11, wherein the operations further comprise:

locking at least a portion of the particular data at the first database system while the first tenant performs one or more operations on the at least a portion at the first instance of the second database system.

16. A system, comprising:

at least one processor; and memory having program instructions stored thereon that are executable by the at least one processor to cause the system to perform operations comprising:

managing, using a first database system, a table storing data for a plurality of tenants that includes a first tenant, the first database system having a first database management engine;

receiving an indication to provision particular data of the first tenant from the table to a second database system having a second database management engine that is operable to provide functionality that is not provided by the first database management engine to the first tenant;

provisioning the particular data from the table to one or more database structures specifically allocated for the first tenant at the second database system but not for remaining ones of the plurality of tenants, wherein the provisioning includes creating, at the second database system, a database schema for the tenant that defines at least a portion of the table associated with the first tenant as a data source of the one or more database structures;

permitting the first tenant to perform, on the particular data, a set of operations at the second database system to use at least a portion of the functionality;

receiving a result of processing by the first tenant using the second database system; and storing the result in the table at the first database system.

17. The system of claim 16, wherein the provisioning includes creating, at the second database system, a tenant database schema that defines a set of tables for the first tenant and the one or more database structures as a data source of the set of tables, wherein the tenant database schema is defined by the first tenant.

18. The system of claim 16, wherein the operations further comprise:

provisioning, at the second database system, particular data of a second tenant of the table in one or more additional database structures, wherein the second tenant is permitted to perform the set of operations at the second database system, and wherein the particular data of the second tenant is inaccessible to the first tenant and the particular data of the first tenant is inaccessible to the second tenant at the second database system.

19. The system of claim 18, wherein the first and second tenants share one or more columns in the table, and wherein provisioning the particular data of the first tenant and the particular data of the second tenant at the second database system includes conforming the particular data of the first tenant in the one or more database structures based on a columns definition provided by the first tenant and conforming the particular data of the second tenant in the one or more additional database structures based on a columns definition provided by the second tenant.

20. The system of claim 16, wherein the operations further comprise:

implementing an interface that allows for insertion of data into the table, wherein the result is received via the interface from the first tenant.

\* \* \* \* \*